United States Patent [19]

Polidor

[11] 4,334,717
[45] Jun. 15, 1982

[54] BALL SLIDE
[75] Inventor: Edward C. Polidor, Port St. Lucy, Fla.
[73] Assignee: Automation Gages, Inc., Rochester, N.Y.
[21] Appl. No.: 214,180
[22] Filed: Dec. 8, 1980
[51] Int. Cl.³ ............................................. F16C 29/04
[52] U.S. Cl. .................................... 308/6 R; 308/3 A
[58] Field of Search ............... 308/6 R, 3 A, 3.8, 3 R, 308/6.1, 7

[56] References Cited
U.S. PATENT DOCUMENTS 3,113,807 12/1963 Polidor .............................. 308/3 A
3,342,534 9/1967 King ................................... 308/6 R
4,262,974 4/1981 Tojo et al. .......................... 308/6 R Primary Examiner—Lenard A. Footland
Attorney, Agent, or Firm—Shlesinger, Fitzsimmons & Shlesinger

[57] ABSTRACT

In this slide opposite sides of a male section are supported by two sets of ball bearings for reciprocable movement in an elongate recess formed in a female section of the slide. Each set of ball bearings is supported in an elongate retainer plate which extends transversely between a pair of confronting grooves formed in the confronting surfaces of the male and female slide sections at each side of the recess. The longitudinal side edges of each retainer plate project between a pair of elongate bearing rods that are mounted in each confronting groove to have rolling engagement with the associated ball bearings. An elongate tapered gib is mounted in the bottom of one of the grooves in the male section, and has an inclined camming surface disposed in coplanar, sliding engagement with a sloping surface formed on the bottom of the last-named groove and lying in a plane which extends parallel to said grooves, and transverse to a common plane containing said retainer plates. A plurality of adjusting screws are threaded into either the bottom or the top of the male section for engagement with the gib, and to adjust the gib in a direction to cause its camming surface to effect lateral preloading of the bearings.

6 Claims, 3 Drawing Figures

U.S. Patent  Jun. 15, 1982  4,334,717
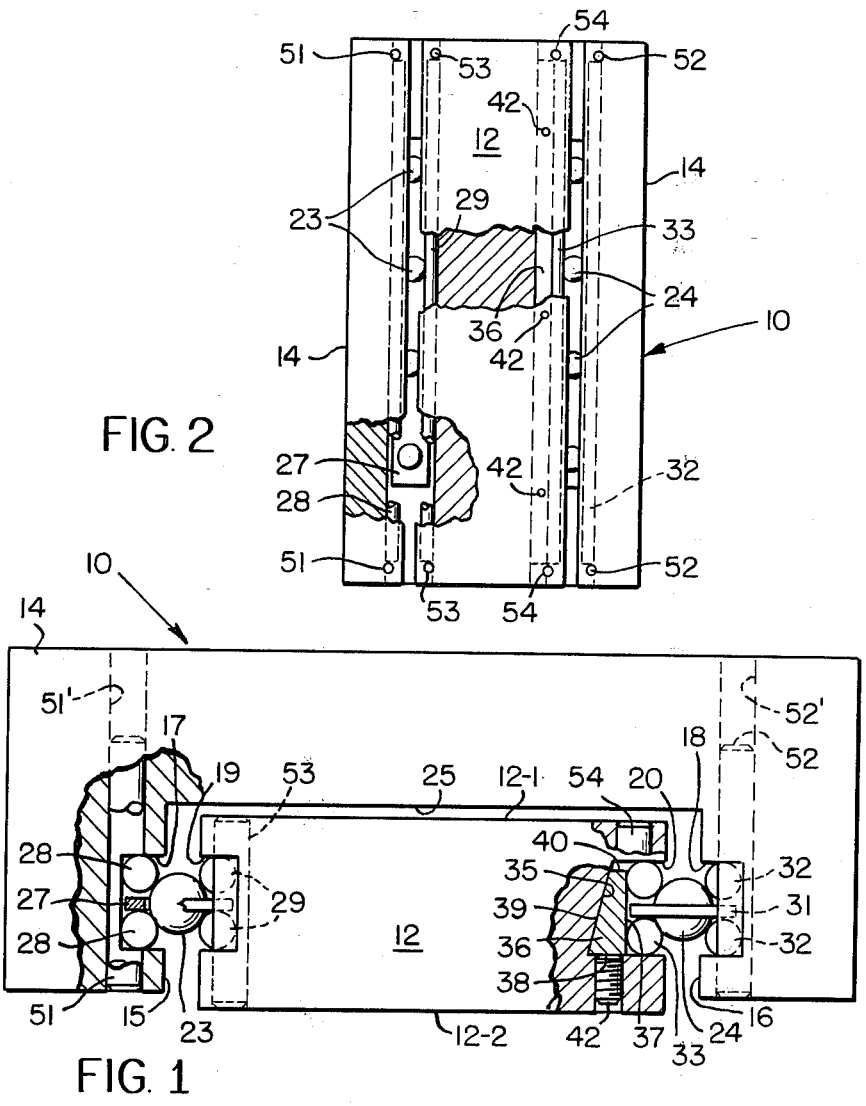
FIG. 2
FIG. 1
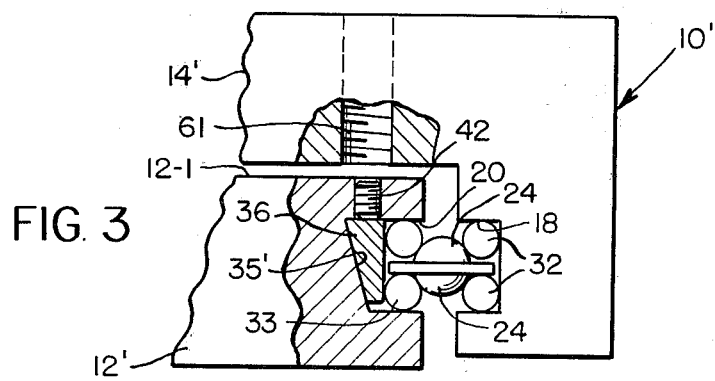
FIG. 3

BALL SLIDE

This invention relates to ball slides for use in connection with precision instruments and the like, and more particularly to an improved ball slide of the type having adjustable means for pre-loading the ball races of the slide.

It has long been conventional to employ tapered gibs or wedges for preloading ball bearing races in various forms of slide bearings, such as for example those disclosed in U.S. Pat. Nos. 2,722,917, 2,047,868, 2,672,378, 2,309,298, 373,866 and 627,456. Slide bearings of the type disclosed by these patents have the disadvantage that most such devices require, in addition to adjusting screws for shifting the gibs, some form of clamping means or screw devices for securing the gibs firmly in place against lateral movement after adjustment thereof. In his U.S. Pat. No. 3,113,807 the applicant herein disclosed a novel ball slide in which an adjustable, tapered gib was housed in a slot or groove formed in one side of the movable tongue portion of the slide, thereby utilizing the sides of the groove for holding the gib against undesirable lateral movement, and thus eliminating the need for employing any additional locking devices for securing the gibs in place after adjustment thereof.

The present invention constitutes an improvement over applicant's ball slide as disclosed in his U.S. Pat. No. 3,113,807. The slide disclosed in the last-mentioned patent requires the machining of a blind (closed at both ends) tapered slot in one side of the tongue section of the slide in order to accommodate the tapered gib. While this construction has the advantage that it provides supporting surfaces for three of the four sides of the tapered gib, it is nevertheless rather difficult, expensive and time-consuming to cut this type of gib slot in one side of the tongue section of the slide. Moreover, the ball bearing keepers at each side of the slide lie in the planes of the spaces separating the tongue section from the female slide member, and it is therefore necessary to secure special retainer plates over opposite ends of these spaces to retain the bearings in the slide.

It is an object of this invention, therefore, to provide an improved ball slide of the type described which is substantially more inexpensive and easier to manufacture than the ball slide disclosed in U.S. Pat. No. 3,113,807.

Another object of this invention is to provide an improved ball slide in which the tapered gib is housed in a slot which extends continuously from one end to the other of the tongue section of the slide, thereby obviating the need to cut or otherwise form a blind slot or groove in the side of the tongue section for the gib.

Still another object of this invention is to provide an improved ball slide in which the ball bearing keepers lie in a common plane, and are held in the slide by stop pins which lie wholly within the tongue and slide member sections, respectively, of the slide.

Other objects of the invention will be apparent hereinafter from the specification and from the recital of the appended claims, particularly when read in conjunction with the accompanying drawing.

In the drawing:

FIG. 1 is a front elevational view of a ball slide made according to one embodiment of this invention, portions of the slide being cut away and shown in section for purposes of illustration;

FIG. 2 is a bottom plan view of this slide, again with portions thereof cut away and shown in section; and FIG. 3 is a fragmentary front elevational view of a modified form of this ball slide.

Referring now to the drawing by numerals of reference, and first to FIGS. 1 and 2, 10 denotes generally a ball slide comprising a generally rectangular, male tongue section 12, and an inverted, generally U-shaped female section or slide member 14 which overlies the tongue section 12. The confronting, inside surfaces 15 and 16 of the legs or furcations of member 14 have formed therein like, longitudinally extending grooves 17 and 18, respectively. These grooves, which are rectantular in cross section, are disposed in spaced, confronting relation to a pair of grooves 19 and 20, respectively, which are formed in the opposed, longtitudinal side edges of the tongue section 12.

Section 12 is mounted by two sets of ball bearings 23 and 24 (four bearings per set in the illustrated embodiment) for longitudinal reciprocation in a rectangular recess 25 formed in the underside of member 14 between its grooved surfaces 15 and 16. The ball bearings 23 are mounted in the usual manner in spaced openings formed in an elongate, rectangular keeper plate 27, the opposed side edges of which project into the grooves 17 and 19, and respectively between a first pair of elongate bearing rods 28 housed in groove 17, and between a second pair of like rods 29 housed in groove 19. Similarly, the ball bearings 24 are mounted in space openings in a further retainer plate 31, the side edges of which project, respectively, into groove 18 between a pair of elongate bearing rods 32, and into the groove 20 between another pair of rods 33 that are housed in groove 20.

Referring to FIG. 1, it will be noted that groove 20 is deeper than any of the other three bearing grooves 17, 18 and 19; and that its bottom surface 35 is disposed in a plane which is inclined to the opposed parallel top and bottom surfaces 12-1 and 12-2, respectively, of the tongue section 12. Adjustable mounted in groove 20 is an elongated, tapered gib or wedge 36, which has an outer surface 37 that extends normal to the surfaces 12-1 and 12-2 of section 12, and which is positioned in abutting relation with the bearing rods 33 at the sides thereof remote from the ball bearings 24. The gib 36 also has a plane side surface 38, which is disposed in confronting, parallel relation to the lower side of the groove 20 as shown in FIG. 1, and an inclined rear surface 39, which is complimentary to, and disposed in coplaner contact with, the inclined surface 35 on section 12. Also as shown more clearly in FIG. 1, the other side surface 40 of the gib extends parallel to its side 38, and lies in a plane located in spaced, confronting relation to the upper edge of groove 20, thereby leaving in the groove enough space to permit slidable adjustment of the gib 36 as noted hereinafter.

Adjustably threaded into the underside of section 12 is a plurality (three in the embodiment illustrated) of spaced adjusting screws 42, each of which has its inner end engaged with the plane side surface 38 on the gib 36 for a purpose noted hereinafter.

To provide means for locking the ball bearing keepers and the gib 36 against movement out of either end of section 12 or 14, the bearing rods 28, 29, 32, and 33 are purposely made slightly shorter in length than the overall lengths of the respective grooves 17, 19, 18 and 20 in which they are mounted. This leaves enough space at each end of each groove for inserting a locking pin or rod into the associated section 12 or 14 to extend transversely across the adjacent ends of the bearing rods 28, 29, 32 and 33.

For example, each of two stop pins or rods 51 is secured in one of a pair of openings 51' formed in member 14 adjacent opposite ends, respectively, of its groove 17 so that each 51 extends transversely across one end of this groove in confronting, blocking relation to the adjacent ends of the two bearing rods 28. Two similar locking pins 52 are mounted in spaced openings 52' formed in the other side of member 14 adjacent opposite ends of its groove 18, and extend transversely across opposite ends of the bearing rods 32 in overlapping, blocking relation thereto.

In a like manner, two sets of stop pins 53 and 54 are secured in openings formed in opposite ends of section 12, and adjacent opposite ends, respectively, of each of its grooves 19 and 20. The pins 53 overlap opposite ends of the rods 29, while pin 54 flank opposite ends of the rods 33, as well as opposite ends of the adjustable gib or wedge 36.

In addition to preventing any undesirable axial movement of the gib 36 and bearing rods 28, 29, 32 and 33, the stop pins 51–54 are also engageable with opposite ends of their associated keeper plate 27 and 31 during reciprocation of the latter, thereby to limit the extent to which the sections 12 and 14 can be reciprocated relative to each other.

In use, the preloading of the bearings, or the removal of any undesirable slack in the bearings, can be readily effected merely by adjusting the screws 42 to cause the wedge or gib 36 to be shifted, for example upwardly in FIG. 1. As the inclined surfaces 35 and 39 slide one relative to the other, the gib 36 is displaced or urged laterally toward the right in FIG. 1, thereby applying uniform pressure to the sides of the bars 33 remote from bearings 24. This lateral movement of the gib 36 tends to spread the respective sets of ball bearings 23 and 24 thus removing any undesirable slack and/or preloading the bearing races as desired.

One of the principal advantages of this type of construction is that each of the respective grooves 17, 18, 19 and 20 can be readily milled or broached, since the grooves do not terminate between the respective ends of the sections 12 or 14, but extend completely through each section from one end thereof to the other. Moreover, by mounting the retainers 27 and 31 to lie in a common plane extending parallel to the plane surfaces on section 12, and so that the retainers project into the flanking grooves 17, 19 or 18, 20, it is possible to employ the locking pins 51–54 to thereby provide extremely simple and inexpensive means for securing the respective bearing units within their associated grooves in sections 12 and 14. This eliminates the need for utilizing special retainer plates and screws of the type heretofore employed for securing the bearing units in their respective slide sections.

Referring now to FIG. 3, wherein like numerals are employed to denote elements similar to those employed in the first embodiment, 10' denotes a modified slide comprising a male tongue section 12' and a female slide section or member 14'. This embodiment is generally similar to that shown in FIGS. 1 and 2, except that in this modified form the bottom 35' of groove 20 is inclined in a direction opposite to that of the first embodiment, and gib 36 is positioned in groove 20 upside down from its position as shown in FIG. 1. Moreover, the three adjusting screws 42 (only one of which is shown in FIG. 3) are mounted in openings formed in the upper surface 12-1 of the tongue section and register, at least for certain positions of section 12' relative to section 14', with enlarged access openings 61 formed in member 14'. With this construction the gib 36 may be preloaded from the top of the slide 10' by inserting a tool downwardly through the openings 61 into driving engagement with the registering adjusting screws 42.

From the foregoing it will be apparent that the instant invention provides an extremely compact and reliable ball slide, which is substantially simpler in configuration, and easier to manufacture, than prior ball slides. The members 12 and 14 may be made from aluminum, and the keepers 27 and 31 from brass. The gib or wedge 16, however, is preferably made from steel.

Moreover, while this invention has been illustrated and described in detail in connection with only two embodiments thereof, it will be apparent that it is capable of still further modification, and that this application is intended to cover any such modifications as may fall within the scope of one skilled in the art, or the appended claims. Obviously, for example, the wedge 36 could be mounted in one of the grooves 17 or 18 in the female member 14, rather than in member 12, in which case the bottom of the groove 17 or 18 would be inclined, accordingly, to surface 25, and the wedge adjusting screws would be mounted in the legs of member 14 in a manner which will be readily apparent in view of the above disclosure.

What I claim is:

1. In a ball slide including an elongate female section, an elongate male section positioned in a recess in said female section and having in opposite sides thereof a pair of opposed, elongate grooves each of which is disposed in spaced, confronting, parallel registry with one of a pair of similar grooves formed in the opposed sidewalls of said recess, and a keeper plate positioned in the space between each pair of confronting grooves, and housing a plurality of roller elements which have rolling engagement with a pair of elongate bearing rods that are mounted in each of said grooves, thereby operatively to support said male section for reciprocation relative to said female section, the improvement wherein said keeper plates extend transversely across the spaces between said confronting grooves, and project at opposite sides thereof, respectively, into each groove of a confronting pair thereof, and between the pair of bearing rods in the last-named groove, one of said grooves in one of said sections is deeper than the other of said grooves and has a sloping bottom surface disposed in a plane which extends parallel to the length of said grooves, and which is inclined to a plane extending parallel to said keeper plates, a tapered gib is mounted in said one groove between said sloping surface and the bearing rods in said one groove, and has thereon an inclined camming surface disposed in coplaner, sliding engagement with said sloped bottom surface on said one groove, and adjustable means is mounted on said one section for engagement with said gib and is operable to effect sliding adjustment of said camming surface relative to said sloped bottom surface of said one groove thereby to effect preloading of said ball bearings.

2. A ball slide as defined in claim 1, wherein each of said grooves extends continuously from one end to the other of the slide section in which it is formed and opens at opposite ends on the exterior of the last-named section, and stop means are secured in each of said sections adjacent each end of each said grooves in position to prevent removal of said gib, rods and plates out of the ends of the associated grooves.

3. A ball slide as defined in claim 1, wherein said one groove is in said male section of the slide, and said adjustable means comprises a plurality of screws threaded into said male section and engaged at their inner ends with said gib at spaced points along its length.

4. A ball slide as defined in claim 3, wherein said screws are threaded into the side of said male section remote from the bottom of said recess in said female section.

5. A ball slide as defined in claim 3, wherein said screws are threaded into the side of said male section which confronts the bottom of said recess in said female section, and said female section has therethrough a plurality of spaced access openings registrable with said screws to permit the insertion of tools through said access openings into contact with said screws.

6. A ball slide as defined in claim 1, wherein said keeper plates lie in a common plane inclined to the plane containing the sloped bottom surface of said one groove.

* * * * *